United States Patent
Kim et al.

(10) Patent No.: US 9,790,369 B2
(45) Date of Patent: Oct. 17, 2017

(54) COMPOSITE MATERIAL AND METHOD FOR PREPARING COMPOSITE MATERIAL

(71) Applicant: Cheil Industries Inc., Gumi-si (KR)

(72) Inventors: Young-Sin Kim, Uiwang-si (KR); Kang-Yeol Park, Uiwang-si (KR); Young-Chul Kwon, Uiwang-si (KR); Seon-Ae Lee, Uiwang-si (KR); Min-Young Lim, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 46 days.

(21) Appl. No.: 14/655,444

(22) PCT Filed: May 2, 2013

(86) PCT No.: PCT/KR2013/003794
§ 371 (c)(1),
(2) Date: Jun. 25, 2015

(87) PCT Pub. No.: WO2014/104490
PCT Pub. Date: Jul. 3, 2014

(65) Prior Publication Data
US 2015/0353736 A1 Dec. 10, 2015

(30) Foreign Application Priority Data
Dec. 31, 2012 (KR) .................. 10-2012-0158472

(51) Int. Cl.
| | | |
|---|---|---|
| C09C 1/62 | (2006.01) | |
| C09C 1/64 | (2006.01) | |
| B05D 5/06 | (2006.01) | |
| B29C 39/02 | (2006.01) | |
| B29C 39/38 | (2006.01) | |
| B32B 15/08 | (2006.01) | |
| B29L 31/00 | (2006.01) | |
| B29K 63/00 | (2006.01) | |
| B29K 29/00 | (2006.01) | |
| B29K 67/00 | (2006.01) | |

(52) U.S. Cl.
CPC .............. C09C 1/62 (2013.01); B05D 5/068 (2013.01); B29C 39/025 (2013.01); B29C 39/38 (2013.01); B32B 15/08 (2013.01); C09C 1/644 (2013.01); B29K 2029/00 (2013.01); B29K 2063/00 (2013.01); B29K 2067/003 (2013.01); B29L 2031/722 (2013.01); B32B 2311/00 (2013.01); B32B 2398/10 (2013.01); C01P 2004/01 (2013.01); C01P 2004/61 (2013.01); C01P 2006/60 (2013.01); Y10T 428/2998 (2015.01)

(58) Field of Classification Search
CPC ....... B32B 15/08; B29C 39/025; B29C 39/38; C09C 1/62; C09C 1/644; B05D 5/068; Y10T 428/2998

USPC .............. 428/407; 264/241; 427/379, 407.1, 427/412.1
See application file for complete search history.

(56) References Cited

U.S. PATENT DOCUMENTS

| | | | |
|---|---|---|---|
| 3,549,405 | A | 12/1970 | Schrenk et al. |
| 3,764,067 | A | 10/1973 | Coffey et al. |
| 3,932,348 | A | 1/1976 | Camelon et al. |
| 4,544,600 | A | 10/1985 | Kern |
| 4,621,112 | A | 11/1986 | Backhouse et al. |
| 4,892,779 | A | 1/1990 | Leatherman et al. |
| 5,010,112 | A | 4/1991 | Glicksman et al. |
| 5,332,767 | A | 7/1994 | Reissner et al. |
| 5,334,657 | A | 8/1994 | Swartzmiller et al. |
| 6,428,875 | B1 | 8/2002 | Takahashi et al. |
| 6,933,044 | B2 | 8/2005 | Ishikawa |
| 7,052,769 | B2 | 5/2006 | Hase et al. |
| 7,485,365 | B2 | 2/2009 | Schuster et al. |
| 7,553,887 | B2 | 6/2009 | Sugimoto et al. |
| 7,820,279 | B2 | 10/2010 | Hiraoka et al. |
| 7,923,099 | B2 | 4/2011 | Park |
| 8,007,902 | B2 | 8/2011 | Smith |
| 8,642,681 | B2 | 2/2014 | Setoguchi |
| 8,946,337 | B2 | 2/2015 | Lee et al. |
| 2002/0013398 | A1 | 1/2002 | Ido et al. |
| 2005/0104214 | A1* | 5/2005 | Maeda .................. H01L 23/145 257/747 |
| 2006/0017193 | A1 | 1/2006 | Asthana et al. |
| 2006/0046057 | A1 | 3/2006 | Huber et al. |
| 2006/0105663 | A1 | 5/2006 | Greulich et al. |
| 2006/0167147 | A1 | 7/2006 | Asgari |
| 2007/0276083 | A1 | 11/2007 | Higashi et al. |
| 2008/0281029 | A1 | 11/2008 | Morvan et al. |

(Continued)

FOREIGN PATENT DOCUMENTS

| | | |
|---|---|---|
| CN | 1541830 | 11/2001 |
| CN | 1427910 A | 7/2003 |

(Continued)

OTHER PUBLICATIONS

International Search Report in counterpart International Application No. PCT/KR2013/003794 dated Sep. 24, 2013, pp. 1-4.
International Search Report and Written Opinion in counterpart International Application No. PCT/KR2013/003794 dated Sep. 24, 2013, pp. 1-10.
Search Report in counterpart Chinese Application No. 201380069442.5 dated Mar. 15, 2016, pp. 1-3.
Notice of Allowance in commonly owned U.S. Appl. No. 14/769,267 dated Dec. 19, 2016, pp. 1-5.
Non-Final Office Action n commonly owned U.S. Appl. No. 13/872,250 dated Nov. 4, 2014, pp. 1-16.
Final Office Action n commonly owned U.S. Appl. No. 13/872,250 dated Apr. 3, 2015, pp. 1-17.
Non-Final Office Action n commonly owned U.S. Appl. No. 13/872,250 dated Dec. 3, 2015, pp. 1-18.
Final Office Action n commonly owned U.S. Appl. No. 13/872,250 dated May 3, 2016, pp. 1-21.

(Continued)

Primary Examiner — Leszek Kiliman
(74) Attorney, Agent, or Firm — Additon, Higgins & Pendleton, P.A.

(57) ABSTRACT

Provided is a complex material that includes a first metal deposition layer, a first thermosetting resin layer positioned on one side of the first metal deposition layer, and a second thermosetting resin layer positioned on the other side of the first metal deposition layer.

21 Claims, 2 Drawing Sheets

(56) References Cited

U.S. PATENT DOCUMENTS

| | | | |
|---|---|---|---|
| 2010/0289187 | A1 | 11/2010 | Bae et al. |
| 2012/0064353 | A1 | 3/2012 | Kawaguchi et al. |
| 2012/0065298 | A1 | 3/2012 | Setoguchi |
| 2012/0129992 | A1 | 5/2012 | Kang et al. |
| 2012/0264869 | A1 | 10/2012 | Lee et al. |
| 2012/0270988 | A1 | 10/2012 | Lee et al. |
| 2014/0066563 | A1 | 3/2014 | Kim et al. |
| 2014/0072795 | A1 | 3/2014 | Kim et al. |
| 2015/0283795 | A1 | 10/2015 | Kim et al. |
| 2015/0376396 | A1 | 12/2015 | Lee et al. |

FOREIGN PATENT DOCUMENTS

| | | | |
|---|---|---|---|
| CN | 1495227 | | 5/2004 |
| CN | 1616223 | | 5/2005 |
| CN | 1692017 | | 11/2005 |
| CN | 1750926 | | 3/2006 |
| CN | 1764698 | A | 4/2006 |
| CN | 101796110 | A | 8/2010 |
| EP | 0801335 | A1 | 10/1997 |
| EP | 1306483 | A1 | 5/2003 |
| EP | 1721939 | A1 | 11/2006 |
| JP | 06-285948 | | 10/1994 |
| JP | 06-044687 | | 11/1994 |
| JP | 07-118561 | A | 5/1995 |
| JP | 07-156299 | A | 6/1995 |
| JP | 08-074037 | | 3/1996 |
| JP | 09-165487 | A | 6/1997 |
| JP | 10-000735 | | 1/1998 |
| JP | 10-017674 | A | 1/1998 |
| JP | 10-182873 | A | 7/1998 |
| JP | 11-010791 | * | 1/1999 |
| JP | 11-010791 | A | 1/1999 |
| JP | 2000-239394 | | 9/2000 |
| JP | 2001-181515 | A | 7/2001 |
| JP | 2001-250992 | | 9/2001 |
| JP | 2001-262003 | | 9/2001 |
| JP | 2002-127328 | | 5/2002 |
| JP | 2003-019777 | | 1/2003 |
| JP | 2003-103733 | | 4/2003 |
| JP | 2004-066500 | A | 3/2004 |
| JP | 2004-083608 | A | 3/2004 |
| JP | 2004-346194 | | 12/2004 |
| JP | 2005-008656 | A | 1/2005 |
| JP | 2005-123735 | | 5/2005 |
| JP | 3697452 | | 8/2005 |
| JP | 2006-026946 | A | 2/2006 |
| JP | 2007-118350 | A | 5/2007 |
| JP | 2007-137963 | | 6/2007 |
| JP | 2007-190702 | | 8/2007 |
| JP | 2007-326314 | A | 12/2007 |
| JP | 2009-035713 | A | 2/2009 |
| JP | 2009-046679 | A | 3/2009 |
| JP | 2010-201669 | | 9/2010 |
| JP | 2010-214790 | A | 9/2010 |
| JP | 2011-026537 | A | 2/2011 |
| JP | 2011-032313 | A | 2/2011 |
| JP | 2011-094056 | | 5/2011 |
| JP | 2011-143584 | | 7/2011 |
| JP | 2011-183577 | A | 9/2011 |
| KR | 10-0227586 | | 1/1999 |
| KR | 10-2001-0033813 | A | 4/2001 |
| KR | 10-2003-0035897 | A | 5/2003 |
| KR | 10-0413082 | | 12/2003 |
| KR | 10-2006-0031692 | A | 4/2006 |
| KR | 10-2006-0078530 | A | 7/2006 |
| KR | 10-2006-0106623 | A | 10/2006 |
| KR | 10-0690898 | B1 | 2/2007 |
| KR | 10-2007-0025229 | A | 3/2007 |
| KR | 10-0693064 | | 3/2007 |
| KR | 10-2007-0102717 | A | 10/2007 |
| KR | 10-2009-0066577 | A | 6/2009 |
| KR | 10-2010-0079612 | A | 7/2010 |
| KR | 10-2010-0123421 | | 11/2010 |
| KR | 10-1000290 | | 12/2010 |
| KR | 10-2011-0008598 | A | 1/2011 |
| KR | 10-2011-0057415 | | 6/2011 |
| KR | 10-2011-0079465 | A | 7/2011 |
| KR | 10-2011-0079466 | A | 7/2011 |
| KR | 10-2011-0107034 | A | 9/2011 |
| KR | 10-2012-0027280 | | 3/2012 |
| KR | 10-2014-0032301 | A | 3/2014 |
| TW | 200621902 | | 7/2006 |
| WO | 2006/041658 | A1 | 4/2006 |
| WO | 2009/029095 | A1 | 3/2009 |
| WO | 2014/065472 | A1 | 5/2014 |
| WO | 2014/104490 | A1 | 7/2014 |
| WO | 2014/129712 | A1 | 8/2014 |

OTHER PUBLICATIONS

Advisory Action n commonly owned U.S. Appl. No. 13/872,250 dated Jul. 15, 2016, pp. 1-7.
Search Report in commonly owned Chinese Application No. 201380067877.6 dated Jan. 6, 2016, pp. 1-2.
International Search Report and Written Opinion in commonly owned International Application No. PCT/KR2013/001291, dated Jun. 10, 2013, pp. 1-6.
Garcia et al., "New Fluorinated Polymers Doped with BODIPY Chromophore as Highly Efficient and Photostable Optical Materials," Chem. Mater. 18, 601-602 (2006).
Office Action in commonly owned U.S. Appl. No. 13/872,260 mailed Sep. 10, 2014, pp. 1-11.
Office Action in commonly owned U.S. Appl. No. 14/437,058 mailed Oct. 27, 2016, pp. 1-2.
Search Report in commonly owned Chinese Application No. 201380073664.4 dated Jul. 26, 2016, pp. 1-2.
Final Office Action in commonly owned U.S. Appl. No. 13/872,260 mailed Apr. 22, 2015, pp. 1-7.
Advisory Action in commonly owned U.S. Appl. No. 13/872,260 mailed Jul. 14, 2015, pp. 1-4.
Notice of Allowance in commonly owned U.S. Appl. No. 13/872,260 mailed Sep. 28, 2015, pp. 1-5.
International Search Report and Written Opinion in commonly owned International Application No. PCT/KR2013/007904 dated Nov. 26, 2013, pp. 1-7.
Office Action in commonly owned U.S. Appl. No. 14/769,267 dated Jan. 15, 2016, pp. 1-13.
Notice of Allowance in commonly owned U.S. Appl. No. 14/769,267 dated Aug. 16, 2016, pp. 1-5.
Extended European Search Report in commonly owned European Application No. 13183216.4 dated Mar. 28, 2014, pp. 1-6.
Search Report in commonly owned Chinese Application No. 2013104044803 dated Mar. 26, 2015, pp. 1-3.
Search Report in commonly owned Chinese Application No. 2013104036417 dated Mar. 8, 2015, pp. 1-2.
European Search Report in commonly owned European Application No. 13183218.0 dated Nov. 26, 2013, pp. 1-5.

\* cited by examiner

[FIG. 1]
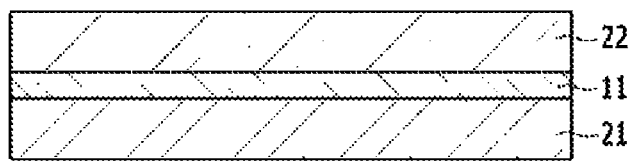
[FIG. 2]
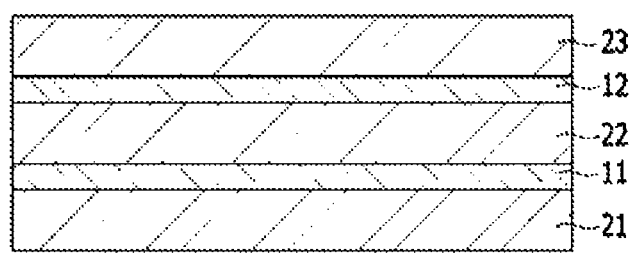
[FIG. 3]
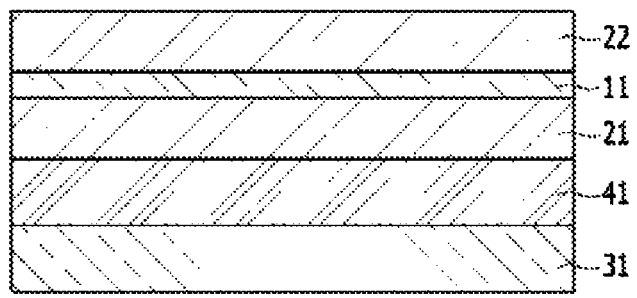
[FIG. 4]
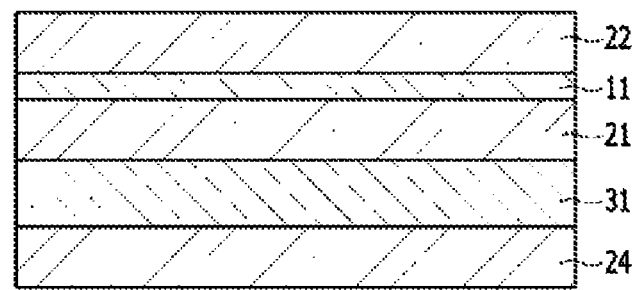

【FIG. 5】
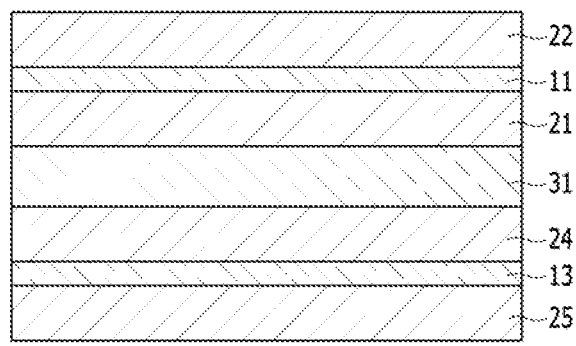

COMPOSITE MATERIAL AND METHOD FOR PREPARING COMPOSITE MATERIAL

CROSS-REFERENCE TO RELATED APPLICATIONS

This application claims priority to and the benefit of International Application No. PCT/KR2013/003794, filed May 2, 2013, which published as WO 2014/104490 on Jul. 3, 2014, and Korean Patent Application No. 10-2012-0158472, filed in the Korean Intellectual Property Office on Dec. 31, 2012, the entire disclosure of each of which is incorporated herein by reference.

TECHNICAL FIELD

A complex material and a method of preparing the complex material are disclosed.

BACKGROUND ART

Recently, plastic exterior products with diverse colors have been winning popularity for electronic parts, automobile parts, and the like. In addition, the plastic exterior products are increasingly realizing high quality sense of touch.

The plastic exterior products usually include a plastic resin and a metal particle and thus, realize a resin appearance with a metal-like texture. Japanese Patent Laid-Open Publication Nos. 2001-262003 and 2007-137963 disclose the metal-like texture.

Japanese Patent Laid-Open Publication No. 2001-262003 discloses a resin composition a flake-shaped metal particulate, and Japanese Patent Laid-Open Publication No. 2007-137963 discloses a resin composition including a glass fiber and a metal particle.

Accordingly, a conventional article formed by adding a metal particle and the like to a plastic resin may realize only a metal-mixing texture but a metal-like texture and thus, be unable to replace a painted article. There are needs for studies of a metal particle capable of realizing appearance near to that of a painted article while not being painted.

DISCLOSURE

Technical Problem

A complex material capable of realizing high luminance and excellent metal-like texture and a method of preparing the complex material are provided.

Technical Solution

In one embodiment, provided is a complex material that includes a first metal deposition layer, a first thermosetting resin layer positioned on one side of the first metal deposition layer, and a second thermosetting resin layer positioned on the other side of the first metal deposition layer.

The complex material may further include a second metal deposition layer positioned on at least one side selected from one side of the first thermosetting resin layer and one side of the second thermosetting resin layer and a third thermosetting resin layer positioned on one side of the second metal deposition layer.

The complex material may further include a thermoplastic resin layer positioned on at least one side selected from one side of the first thermosetting resin layer and one side of the second thermosetting resin layer.

The complex material may further include an auxiliary layer positioned between the first thermosetting resin layer and the thermoplastic resin layer, or between the second thermosetting resin layer and the thermoplastic resin layer.

The complex material may further include a fourth thermosetting resin layer positioned on one side of the thermoplastic resin layer.

The complex material may further include a third metal deposition layer positioned on one side of the fourth thermosetting resin layer and a fifth thermosetting resin layer positioned on one side of the third metal deposition layer.

The thermoplastic resin layer may include a polycarbonate resin, a rubber-modified vinyl-based copolymer resin, a polyester resin, a polyalkyl(meth)acrylate resin, a styrene-based polymer, a polyolefin resin, or a combination thereof.

The first metal deposition layer may be an aluminum deposition layer.

A thickness of the first metal deposition layer may be 0.01 to 1.0 μm.

The first thermosetting resin layer and the second thermosetting resin layer are independently a phenolic resin, an epoxy resin, an unsaturated polyester resin, an urethane resin, an urea resin, a melamine resin, an alkyd resin, a silicone resin, a vinylester resin, or a combination thereof.

Each refractive index of the first thermosetting resin layer and the second thermosetting resin layer may be 1.45 to 1.55.

The first thermosetting resin layer and the second thermosetting resin layer may be transparent or translucent.

A thickness of the complex material may be 1 to 100 μm.

A particle diameter of the complex material may be 2 to 2,000 μm.

In another embodiment, provided is a method of preparing a complex material that includes forming a first thermosetting resin layer on a substrate, forming a metal deposition layer on the first thermosetting resin layer, and forming a second thermosetting resin layer on the metal deposition layer.

The substrate may be a thermoplastic resin layer.

The forming of the first thermosetting resin layer may include applying a first thermosetting resin composition on the substrate and heat-treating the same, and forming of the second thermosetting resin layer may include applying a second thermosetting resin composition on the metal deposition layer and heat-treating the same.

The method may further include forming an auxiliary layer on one side of the substrate before forming the first thermosetting resin layer.

The method may further include separating the substrate from the first thermosetting resin layer after forming the second thermosetting resin layer.

The method may further include forming a second metal deposition layer on the second thermosetting resin layer and then, forming a third thermosetting resin layer on the second metal deposition layer after forming the second thermosetting resin layer.

The method may further include forming a fourth thermosetting resin layer on the external side of the substrate after forming the second thermosetting resin layer.

The method may further include forming a third metal deposition layer on the external side of the fourth thermosetting resin layer and forming a fifth thermosetting resin layer on the external side of the third metal deposition layer after forming the fourth thermosetting resin layer.

Advantageous Effect

A complex material according to one embodiment and according to the method of preparing a complex material realizes high luminance and excellent metal-like texture. When this complex material is applied to a resin article, the resin article may show close appearance to that of a painted resin article without being painted.

BRIEF DESCRIPTION OF THE DRAWINGS

FIGS. 1 to 5 are schematic views respectively showing the cross sections of complex materials according to various embodiments.

BEST MODE

Hereinafter, embodiments are described in detail. However, these embodiments are only exemplary, and the present invention is not limited thereto.

In the present specification, when specific definition is not otherwise provided, "(meth)acrylate" refers to both "acrylate" and "methacrylate". In the present specification, when a definition is not otherwise provided, "copolymerization" may refer to block copolymerization, random copolymerization, graft copolymerization or alternate copolymerization, and "copolymer" may refer to a block copolymer, a random copolymer, a graft copolymer or an alternate copolymer.

In the present specification, when specific definition is not otherwise provided, a particle size, a particle diameter, a major axis, a grain size, an equivalent diameter, and the like have the same meanings. Herein, a major axis refers the longest length of line connecting two points in a closed curve, and the closed curve is a curved line where a point moves in one direction and returns to the departure point.

In the present specification, when specific definition is not otherwise provided, a thickness refers to a length that is perpendicular to flat surface including a major axis.

In the present invention, an average particle diameter and a thickness of the metal-resin composite particle and the like are respectively obtained by sampling a part of articles and measuring particle diameters and thicknesses of greater than or equal to 50 particles and calculating arithmetic means of the particle diameter and thickness measurements of the rest of the particles except for top 10% and bottom 10% of the particles based on the SEM image through an analysis of the cross section of the article based on a scanning electron microscope (SEM, S4800, Hitachi Inc.).

Complex Material

FIGS. 1 to 5 are cross-sectional views respectively showing cross-sections of the complex materials according to various embodiments.

In one embodiment, provided is a complex material that includes a metal deposition layer 11, a thermosetting resin layer 21 positioned on one side of the metal deposition layer 11, and a thermosetting resin layer 22 positioned on the other side of the metal deposition layer 11. The structure is shown in FIG. 1.

The complex material may realize high luminance and excellent metal-like texture. When this complex material is applied to a resin article, the resin article may show close appearance to a painted article without being painted. Specifically, the complex material includes a metal deposition layer 11 and thus, may realize very high flatness and show high luminance and excellent metal-like texture. In addition, the complex material includes the thermosetting resin layers 21 and 22 and thus, is uniformly dispersed in a resin article without being melt or causing no chemical reaction when used to manufacture the resin article and may realize high luminance and excellent metal-like texture.

In general, when metal particles are applied to form a metal-like texture on a resin article, the metal particles are intensively distributed in a central layer with a reference to the cross section of the resin article. Herein, the resin article shows no excellent metal-like texture and luminance and a distant appearance from that of a painted article. On the other hand, when the complex material according to one embodiment is applied to manufacture a resin article, the complex material is not intensively dispersed in the center layer of the resin article with a reference to its cross section but uniformly dispersed in the resin article. Accordingly, the resin article shows high luminance, very excellent metal-like texture and a close appearance to that of a painted resin article.

The thermosetting resin layer 21 and the thermosetting resin layer 22 may be the same or different.

The metal deposition layer 11 and the thermosetting resin layers 21 and 22 may be repeatedly laminated. Herein, the complex material may have a multi-layer structure having greater than equal to three layers.

The complex material may include the metal deposition layer 11 as one layer or greater than or equal to two layers. However, both sides of the metal deposition layer 11 may be coated with the thermosetting resin layers 21 and 22.

For example, the complex material may further include a metal deposition layer 12 positioned on one side or both sides of the thermosetting resin layers 21 and 22 and a thermosetting resin layer 23 positioned on one side of the metal deposition layer 12. This structure is provided in FIG. 2. Herein, the complex material includes two metal deposition layers 11 and 12 and thus, may have high flatness and also, realize high luminance and excellent metal-like texture.

For another example, the complex material may further include a thermoplastic resin layer 31 positioned on one side or both sides of the thermosetting resin layers 21 and 22. Herein, the thermoplastic resin layer 31 may be a substrate when used to prepare the complex material.

In addition, the complex material may further include an auxiliary layer 41 between the thermosetting resin layers 21 and 22 and the thermoplastic resin layer 31. This structure is shown in FIG. 3.

As shown in FIG. 3, when the thermoplastic resin layer 31 is present at the outmost of the complex material, the complex material may be used after removing the thermoplastic resin layer 31. Or, when the complex material is applied to an article, the thermoplastic resin layer 31 may be melted and separated from the complex material by melting/kneading the complex material with a general thermoplastic resin composition. In this way, when the thermoplastic resin layer 31 is separated from the complex material, the auxiliary layer 41 is separated therewith, and thus, the complex material may have a structure shown in FIGS. 1 and 2.

The auxiliary layer 41 may play a role of separating the thermoplastic resin layer 31 from the complex material. In other words, the auxiliary layer 41 may be a release coating layer. The auxiliary layer 41 may include a material generally used in an art to which the present invention belongs, for example, polyvinyl alcohol and the like. In addition, a slip agent such as erucamide and the like may be optionally included.

For another example, the complex material may further include a thermosetting resin layer 24 positioned on one side of the thermoplastic resin layer 31. This structure is shown in FIG. 4. As shown in FIG. 4, when the thermosetting resin layers 22 and 24 are positioned at the outmost of the complex material, the thermoplastic resin layer 31 may not be separated from the complex material but included therein.

On the other hand, the complex material may further include a metal deposition layer 13 positioned on one side of the thermosetting resin layer 24 and a thermosetting resin layer 25 positioned on one side of the metal deposition layer 13. This structure is shown in FIG. 5. Herein, the thermoplastic resin layer 31 may not be separated from the complex material but included therein. In addition, as shown FIG. 5, the complex material includes two metal deposition layers and thus, may have high flatness and also, realize high luminance and excellent metal-like texture.

Hereinafter, each component included in the complex material is specifically described.

Metal Deposition Layers 11, 12, and 13

In general, a metal particle shows higher luminance and more excellent metal-like texture, as it has higher surface flatness. The complex material includes metal deposition layers 11, 12, and 13 having very high flatness and may realize luminance and excellent metal-like texture.

The metal deposition layer 11, the metal deposition layer 12, and the metal deposition layer 13 may be the same or different.

The metal deposition layers 11, 12, and 13 may include aluminum, copper, gold, or a combination thereof. Particularly, an aluminum deposition layer may show excellent metal-like texture and specifically, a similar metal-like texture to silver.

The method of forming the metal deposition layers 11, 12, and 13, that is, a method of depositing a metal may be any general deposition method without limitation, specifically sputtering, E-beam evaporation, thermal evaporation, laser molecular beam epitaxy (L-MBE), pulsed laser deposition (PLD), metal-organic chemical vapor deposition (MOCVD), hydride vapor phase epitaxy (HVPE) and the like.

The thicknesses of the metal deposition layers 11, 12, and 13 may be 0.01 to 1 μm, specifically 0.01 to 0.9 μm, 0.01 to 0.8 μm, 0.01 to 0.7 μm, 0.01 to 0.6 μm, 0.01 to 0.5 μm, 0.05 to 1 μm, 0.1 to 1 μm, 0.2 to 1 μm, 0.3 to 1 μm, or 0.4 to 1 μm. The metal deposition layers 11, 12, and 13 may have a very thinner thickness than a general metal particle such as a metal particle obtained by grinding a metal foil and the like. Accordingly, the metal deposition layers 11, 12, and 13 may have much higher flatness and luminance than the general metal particle.

When the metal deposition layers 11, 12, and 13 has a thickness within the range, the complex material including these may show very excellent flatness and realize high luminance and excellent metal-like texture.

Thermosetting Resin Layers 21, 22, 23, 24, and 25

The thermosetting resin layers 21, 22, 23, 24 and 25 may be the same or different one another.

The complex material includes the thermosetting resin layers 21, 22, 23, 24, and 25 and thus, may be uniformly dispersed in a resin article when applied to manufacture the resin article. Particularly, when the thermosetting resin layers 21, 22, 23, 24, and 25 are present at the outmost of the complex material, the complex material may be uniformly dispersed in a resin article without being melted or causing a chemical reaction when applied to manufacture the resin article.

For example, when the complex material is melted/kneaded with a thermoplastic resin at a high processing temperature, the thermosetting resin layers 21, 22, 23, 24, and 25 may be neither melted nor separated and cause no chemical reaction with the thermoplastic resin. Accordingly, the complex material is not modified at a high processing temperature but maintains a shape and properties and may be uniformly dispersed in the resin article.

The thermosetting resin layers 21, 22, 23, 24, and 25 include a thermosetting resin, and the thermosetting resin may be applied as a resin generally used in an art to which the present invention belongs without a particular limit. Specifically, the thermosetting resin layers 21, 22, 23, 24, and 25 may include a phenolic resin, an epoxy resin, an unsaturated polyester resin, a urethane resin, a urea resin, a melamine resin, an alkyd resin, a silicone resin, a vinyl ester resin, or a combination thereof. More specifically, the thermosetting resin layers 21, 22, 23, 24, and 25 may include an epoxy resin, a silicone resin, or a combination thereof.

The epoxy resin indicates a thermosetting resin having an epoxy group inside a molecule and is synthesized through condensation polymerization of bisphenol-A and epichlorohydrin. The epoxy resin may have excellent mechanical properties such as transparency, heat resistance, strength, hardness, and the like.

The silicone resin is a thermosetting resin obtained through polymerization of an organic derivative of silicon to which a methyl group, a phenyl group, a hydroxy group and the like are added by using a siloxane bond (Si—O) as a backbone in which the silicon and oxygen are alternately present. The silicone resin has excellent transparency, heat resistance, cold resistance, and insulation properties.

The thermosetting resin layers 21, 22, 23, 24, and 25 may further include a hardener. The hardener may include any hardener cured by three-dimensionally mesh-structuralizing a thermosetting resin. For example, when a functional group introduced in a side chain is carboxyl-based, an epoxy-based hardener is mainly used, and when the functional group introduced in the side chain is hydroxyl-based, an isocyanate hardener is mainly used. In addition, an amine-based hardener, a melamine-based hardener and the like may be used, and a combination of more than two components selected from the epoxy-based, isocyanate-based, amine-based, and melamine-based hardeners and the like may be used. In addition, a curing promoter may be additionally used to shorten a curing time.

The thermosetting resin layers 21, 22, 23, 24, and 25 may further include an additive. The additive may be polyvinyl butyral (PVB). When the thermosetting resin 21, 22, 23, 24, and 25 further includes the additive, adherence of the metal deposition layers 11, 12, and 13 to the thermosetting resin layers 21, 22, 23, 24, and 25 is improved, and transparency of the thermosetting resin layers 21, 22, 23, 24, and 25 is improved. The complex material including this may realize high luminance and excellent metal-like texture.

The thermosetting resin layers 21, 22, 23, 24, and 25 may have the same or a different refractive index and respectively, ranging from 1.45 to 1.55. Herein, the complex material shows excellent metal-like texture and very excellent luminance. Particularly, when the complex material including the thermoplastic resin satisfying the refractive index range is used to manufacture a resin article, the resin article may show a similar metal-like texture to a painted article and very excellent luminance.

Thicknesses of the thermosetting resin layers 21, 22, 23, 24, and 25 may be 0.5 to 10 μm. Specifically, they may be 0.5 to 9 μm, 0.5 to 8 μm, 0.5 to 7 μm, 0.5 to 6 μm, 0.5 to 5 μm, 1 to 10 μm, 2 to 10 μm, 3 to 10 μm, or 4 to 10 μm.

Herein, the complex material shows very excellent flatness and may realize high luminance and excellent metal-like texture.

Each of the thermosetting resin layers 21, 22, 23, 24, and 25 may be transparent or translucent. In other words, the thermosetting resin layers 21, 22, 23, 24, and 25 may have the same or a different haze, and the haze may be independently in a range of 0.5 to 40%. Specifically, it may be in a range of 0.5% to 40%, 0.5% to 35%, 0.5% to 30%, 0.5% to 25%, 0.5% to 20%, and 0.5% to 15%.

The transparency means that all incident light transmits, and the translucence means that a part of lights transmits.

The haze indicates turbidity or cloudiness. In the present specification, the haze may be calculated through the following Calculation Equation 1.

Haze (%)={diffused light/(diffused and transmitted light+parallel transmitted light)}×100 [Calculation Equation 1]

As the haze is close to 0, it indicates more transparency.

When the thermosetting resin layers 21, 22, 23, 24, and 25 are transparent or translucent, that is, when the haze satisfies the range, the complex material may realizes high luminance and excellent metal-like texture.

Thermoplastic Resin Layer 31

The thermoplastic resin layer 31 may be a substrate when used to prepare the complex material.

The thermoplastic resin layer 31 may be present at the outmost of the complex material as shown in FIG. 3 or in the internal layer of the complex material as shown in FIGS. 4 and 5.

As shown in FIG. 3, when the thermoplastic resin layer 31 is present at the outmost of the complex material, the thermoplastic resin layer 31 may be delaminated from the complex material or melted and thus, separated from the complex material when applied to manufacture a resin article.

As shown in FIGS. 4 and 5, when the thermoplastic resin layer 31 is positioned in the internal layer of the complex material, the thermoplastic resin layer 31 may make thicknesses of the thermosetting resin layers 21, 22, 23, 24, and 25 more uniform and increase flatness of the metal deposition layers 11, 12, and 13. Accordingly, the complex material including the thermoplastic resin layer 31 may show very excellent flatness.

The thermoplastic resin layer 31 may include a thermoplastic resin. The thermoplastic resin may be any transparent or translucent resin without limitation. For example, the thermoplastic resin layer 31 may include a polycarbonate resin, a rubber modified vinyl-based copolymer resin, a polyester resin, a polyalkyl(meth)acrylate resin, a styrene-based polymer, a polyolefin resin, or a combination thereof.

Specifically, the thermoplastic resin layer 31 may be selected from a polyethylene terephthalate resin, a polytrimethylene terephthalate resin, a polybutylene terephthalate resin, a polyhexamethylene terephthalate resin, a polycyclohexane dimethylene terephthalate resin, a non-crystalline polyethylene terephthalate resin, and a combination thereof.

The polyethylene terephthalate resin is a condensation-polymerized polymer that is obtained through a direct ester reaction or an ester exchange reaction of ethylene glycol monomer, and terephthalic acid or dimethyl terephthalate monomer.

Also, in order to increase the impact strength of the polyethylene terephthalate resin, the polyethylene terephthalate resin may be copolymerized with polytetramethylene glycol (PTMG), polypropylene glycol (PPG), a low molecular weight aliphatic polyester or aliphatic polyamide, or may be used in the form of a modified polyethylene terephthalate resin obtained by blending with a component improving an impact strength.

The thermoplastic resin layer 31 may have a refractive index ranging from 1.45 to 1.55. Particularly, when the thermoplastic resin layer 31 has a similar refractive index to those of the thermosetting resin layers 21, 22, 23, 24, and 25, the complex material including this thermoplastic resin layer 31 may show a similar metal-like texture to that of a painted one without being painted and realize excellent luminance.

The thermoplastic resin layer 31 may be transparent or translucent. In other words, the thermoplastic resin layer 31 may have a haze ranging from 0.5 to 40%. Specifically, the haze may be in a range of 0.5 to 40%, 0.5 to 35%, 0.5 to 30%, 0.5 to 25%, 0.5 to 20%, and 0.5 to 15%. Herein, the complex material including the thermoplastic resin layer 31 may show a similar metal-like texture to that of a painted one without being painted and realize excellent luminance.

A thickness of the thermoplastic resin layer 31 may be 0.5 to 30 µm. Specifically, it may be 0.5 to 25 µm, 0.5 to 20 µm, 0.5 to 15 µm, 0.5 to 10 µm, 0.5 to 5 µm, 1 to 30 µm, 2 to 30 µm, 3 to 30 µm, or 4 to 30 µm. Herein, the complex material may show very excellent flatness and realize high luminance and excellent metal-like texture.

On the other hand, a thickness of the complex material may be 1 to 100 µm. Specifically, it may be 1 to 90 µm, 1 to 80 µm, 1 to 70 µm, 1 to 60 µm, 1 to 50 µm, 2 to 100 µm, 3 to 100 µm, 4 to 100 µm, 5 to 100 µm, 10 to 100 µm, 20 to 100 µm, 30 to 100 µm, or 40 to 100 µm. Herein, the complex material may realize high luminance and excellent metal-like texture.

A particle diameter of the complex material may be 2 to 2,000 µm. Specifically, it may be 2 to 1,500 µm, 2 to 1,000 µm, 2 to 900 µm, 2 to 800 µm, 2 to 700 µm, 2 to 600 µm, 2 to 500 µm, 10 to 1,000 µm, 20 to 1,000 µm, 30 to 1,000 µm, 40 to 1,000 µm, or 50 to 1,000 µm. Herein, the complex material may realize high luminance and realize excellent metal-like texture.

Method of Preparing Complex Material

Another embodiment provides a method of preparing the complex material, which includes forming the thermosetting resin layer 21 on a substrate, forming the metal deposition layer 11 on the thermosetting resin layer 21, and forming the thermosetting resin layer 22 on the metal deposition layer 11.

In the preparing method, the formation of the metal deposition layer 11 and the formation of the thermosetting resin layers 21 and 22 are repeatedly repeated. Herein, the complex material may have greater than or equal to three layered multi-layer structure.

A complex material prepared according to the method may realize high luminance and an excellent metal-like texture. When this complex material is used to manufacture a resin article, the resin article may show close appearance to that of a painted resin article without being painted. Specifically, the preparing method includes the formation of the metal deposition layer 11 and thus, may provide a complex material having very high luminance and an excellent metal-like texture. In addition, the preparing method includes the formation of the thermosetting resin layers 21 and 22 and thus, may provide a complex material uniformly dispersed in the resin article without being molten or causing no chemical reaction.

The substrate may be any material capable of easily forming the thermosetting resin layer 21 without a particular limit and for example include plastic, glass and the like.

Preferably, the substrate may be a thermoplastic resin layer 31.

The method of forming the metal deposition layer 11, that is, a method of depositing a metal may be any general deposition method without limitation, specifically sputtering, E-beam evaporation, thermal evaporation, laser molecular beam epitaxy (L-MBE), pulsed laser deposition (PLD), metal-organic chemical vapor deposition (MOCVD), hydride vapor phase epitaxy (HVPE) and the like.

The formation of the thermosetting resin layer 21 may further include a heat treatment after applying a thermosetting resin composition on the substrate. In addition, the formation of the thermosetting resin layer 22 may include a heat treatment after applying a thermosetting resin composition on the metal deposition layer 11.

The thermosetting resin composition may include a phenolic resin, an epoxy resin, an unsaturated polyester resin, an urethane resin, an urea resin, a melamine resin, an alkyd resin, a silicone resin, a vinylester resin, or a combination thereof. Specifically, the thermosetting resin composition may include the epoxy resin, the silicone resin or a combination thereof. Details of each resin are the same as described above.

The thermosetting resin composition may be applied in a method of bar coating, gravure coating, comma coating, reverse roll coating, applicator coating, spray coating and the like, but the present is not limited thereto.

The heat treatment may be performed in a range of 80 to 150° C. When the heat treatment is performed within the temperature range, the thermosetting resin composition is sufficiently cured and may form the thermosetting resin layers 21 and 22 having excellent flatness and adherence, and a complex material including these thermosetting resin layers 21 and 22 may be uniformly dispersed a resin article without being melt or causing no chemical reaction and thus, may realize high luminance and excellent metal-like texture.

The heat treatment may be performed under an air atmosphere, an inert gas atmosphere or a vacuum atmosphere.

In addition, the heat treatment may be performed for 1 minute to 3 hours. When the heat treatment is performed within the time range, the thermosetting resin composition is sufficiently cured and forms the thermosetting resin layers 21 and 22 having excellent flatness and adherence, and a complex material including this thermosetting resin composition may be uniformly dispersed in a resin article without being melted or causing no chemical reaction and realize high luminance and excellent metal-like texture.

The preparing method may further include forming an auxiliary layer 41 on one side of the substrate before forming the thermosetting resin layer 21. In other words, the preparing method may include forming the auxiliary layer on the substrate, forming the thermosetting resin layer 21 on the auxiliary layer, forming the metal deposition layer 11 on the thermosetting resin layer 21, and forming the thermosetting resin layer 22 on the metal deposition layer 11. FIG. 3 schematically shows the cross section of the complex material prepared according to the method.

The preparing method further includes forming the auxiliary layer 41 and thus, may easily separate the substrate from the complex material. The formation of the auxiliary layer 41 is performed by applying a composition including a material generally used in an art to which the present invention belongs, for example, polyvinyl alcohol and the like on the substrate. In addition, the composition may further include a slip agent such as erucamide and the like.

The substrate may be delaminated from the complex material. Or, the substrate is melt when the complex material is applied to manufacture a resin article and thus, may be separated from the complex material. In other words, the preparing method may further include separating the substrate from the thermosetting resin layer 21 after forming the thermosetting resin layer 22.

For example, when a thermoplastic resin layer 31 playing a role of a substrate is separated from a complex material in the structure of the complex material shown in FIG. 3, the auxiliary layer 41 is also separated therewith, and the complex material may have the structure shown in FIG. 1.

On the other hand, the preparing method may further include forming the metal deposition layer 12 on the thermosetting resin layer 22 after forming the thermosetting resin layer 22 and then, forming the thermosetting resin layer 23 on the metal deposition layer 12. Herein, the metal deposition layers 11 and 12 are two layers in total.

Hereinafter, when the thermoplastic resin layer 31 is separated from the complex material, the auxiliary layer 41 is separated therewith, forming a structure shown in FIG. 2. As shown in FIG. 2, the complex material includes two metal deposition layers on both sides of a flat side and thus, may realize very excellent luminance and metal-like texture and also, may be uniformly dispersed in a resin article without being melt or causing no chemical reaction since the thermosetting resin layers 21 and 23 are positioned at the outmost of the flat side and thus, realize high luminance and excellent metal-like texture.

On the other hand, the substrate may not be separated from the complex material but included in the internal layer of the complex material. For example, the preparing method may further include forming the thermosetting resin layer 21 on a substrate, forming the metal deposition layer 11 on the thermosetting resin layer 21, forming the thermosetting resin layer 22 on the metal deposition layer 11, and formation of a thermosetting resin layer 24 on the external side of the substrate. Herein, the structure shown in FIG. 4 is formed. FIG. 4 shows the structure in which the substrate is the thermoplastic resin layer 31.

The preparing method may further include forming the metal deposition layer 13 on the external side of the thermosetting resin layer 24 after forming the thermosetting resin layer 24 on the external side of the substrate, and forming the thermosetting resin layer 25 on the external side of the metal deposition layer 13. Herein, the structure shown in FIG. 5 is formed.

In this way, when the substrate is in the internal layer of a complex material, the substrate may make the thicknesses of the thermosetting resin layers 21, 22, 23, 24, and 25 more uniform and increase flatness of the metal deposition layers 11 and 13.

As shown in FIGS. 4 and 5, when the thermosetting resin layers 22, 24, and 25 are present at the outmost of the complex material, the complex material may be uniformly dispersed in a resin article without being melt or causing no chemical reaction when used to manufacture the resin article. Accordingly, the complex material may realize high luminance and excellent metal-like texture.

Particularly, the structure shown in FIG. 5 includes two metal deposition layers in total at both sides of the flat side of a complex material and thus, may realize very excellent luminance and metal-like texture.

The metal deposition layers 11 and 13, the thermosetting resin layers 21, 22, 23, 24, and 25 and the thermoplastic resin layer 31 are the same as above and will not be described in detail.

The method of preparing a complex material may further include grinding the complex material as a last step. Accordingly, the complex material obtained according to the preparing method may have various sizes through the grinding depending on a use.

The grinding method may be performed by using a laser cutting machine, a multi blade cutting machine, vacuum suction using a mesh and the like.

The ground complex material may have a particle diameter ranging from 2 to 2,000 µm. Specifically, it may be 2 to 1,500 µm, 2 to 1,000 µm, 2 to 900 µm, 2 to 800 µm, 2 to 700 µm, 2 to 600 µm, 2 to 500 µm, 10 to 1,000 µm, 20 to 1,000 µm, 30 to 1,000 µm, 40 to 1,000 µm, or 50 to 1,000 µm. Herein, the complex material may realize high luminance and excellent metal-like texture.

The complex material may have the same average thickness before and after the grinding and specifically, be in a range of 1 to 100 µm. Specifically, it may be 1 to 90 µm, 1 to 80 µm, 1 to 70 µm, 1 to 60 µm, 1 to 50 µm, 2 to 100 µm, 3 to 100 µm, 4 to 100 µm, 5 to 100 µm, 10 to 100 µm, 20 to 100 µm, 30 to 100 µm, or 40 to 100 µm. Herein, the complex material may realize high luminance and excellent metal-like texture.

Hereinafter, specific examples of the present invention are described. These examples, however, are not in any sense to be interpreted as limiting the scope of the invention.

MODE FOR INVENTION

Preparation Example 1

An auxiliary layer was formed by coating polyvinyl alcohol and erucamide as a slip agent on a polyethylene terephthalate (PET) film substrate, and a thermally-curing resin layer having a refractive index of 1.47 was formed by coating a composition including 93 wt % of a bisphenol-A type epoxy resin, 1 wt % of an amine-based hardener, 1 wt % of a curing promoter and 5 wt % of polyvinyl butyral was coated thereon and curing at 100° C. for 5 minutes. Next, an about 0.07 µm-thick aluminum deposition layer was formed thereon by sputtering/depositing aluminum. Then, one more thermally-curing resin layer having a refractive index of 1.47 was formed thereon by coating a composition including 93 wt % of a bisphenol-A type epoxy resin, 1 wt % of an amine-based hardener, 1 wt % of a curing promoter and 5 wt % of polyvinyl butyral again thereon and thermally curing it at 100° C. for 5 minutes, obtaining a complex material, and then, the complex material was ground with a grounder of ACI Laser Klasse 1, obtaining a complex material having a thickness of about 18 µm and an average particle diameter of about 200 µm. FIG. 3 shows the structure of the complex material prepared according to Preparation Example 1.

Preparation Example 2

A complex material was prepared according to the same method as Preparation Example 1 except for forming one more thermally curing resin layer having a refractive index of 1.47 by coating a composition including 93 wt % of a bisphenol-A type epoxy resin, 1 wt % of an amine-based hardener, 1 wt % of a curing promoter and 5 wt % of polyvinyl butyral on another side of the terephthalate (PET) film substrate and thermally curing it at 100° C. for 5 minutes before the grinding in Preparation Example 1.

Preparation Example 3

A complex material was prepared according to the same method as Preparation Example 2 except for forming an about 0.07 µm-thick aluminum deposition layer by depositing aluminum on the other side of the third thermally-curing resin layer before the grinding in Preparation Example 2 and another thermally-curing resin layer having a refractive index of 1.47 by coating a composition including 93 wt % of a bisphenol-A type epoxy resin, 1 wt % of an amine-based hardener, 1 wt % of a curing promoter and 5 wt % of polyvinyl butyral thereon and curing it at 100° C. for 5 minutes.

EXAMPLE

An article was manufactured to have a composition provided in the following Table 1. The following components and a method of manufacturing the article are described in detail.

TABLE 1

| Components | unit | Examples | | | | Comparative Examples | | |
|---|---|---|---|---|---|---|---|---|
| | | 1 | 2 | 3 | 4 | 1 | 2 | 3 |
| Thermoplastic resin (A) | wt % | 100 | 100 | 100 | 100 | 100 | 100 | 100 |
| Complex material (B-1) | parts by weight | 1.0 | 2.0 | — | — | — | — | — |
| Complex material (B-2) | parts by weight | — | — | 1.0 | — | — | — | — |
| Complex material (B-3) | parts by weight | — | — | — | 1.0 | — | — | — |
| Metal particle (C) | parts by weight | — | — | — | — | 1.0 | — | — |
| Metal particle (D) | parts by weight | — | — | — | — | — | 1.0 | — |

(Reference): Comparative Example 3 was an aluminum-painted article.
(A) thermoplastic resin: A transparent acrylonitrile-butadiene-styrene-methylmethacrylate (MABS) copolymer resin having a refractive index of 1.52 and a haze of 1.7% in a 3.2 mm-thick specimen and made by Cheil Industries Inc. (Korea).
(B-1) Complex material: A complex material prepared in Preparation Example 1.
(B-2) Complex material: A complex material prepared in Preparation Example 2.
(B-3) Complex material: A complex material prepared in Preparation Example 3.
(C) Metal particle: An about 20 µm-thick amorphous sheet-shaped aluminum particle having an average particle diameter of about 100 µm and made by Nihonboitz (Japan).
(D) Metal particle: An about 0.1 µm-thick amorphous sheet-shaped aluminum particle having an average particle diameter of about 8 µm and made by Silberline Manufacturing Co., Ltd. (U.S.A.).

Examples 1 to 4 and Comparative Examples 1 to 3

Each resin composition according to Examples 1 to 4 and Comparative Examples 1 to 3 was prepared to respectively have a composition provided in Table 1. The resin composition was extruded through a twin-screw extruder at a temperature ranging 180 to 240° C. and then, manufactured into a pellet.

Each pellet was dried at 80° C. for 4 hours and then, injection-molded by using an injection molder having injection capability of 6 Oz, setting a cylinder temperature in a range of 220 to 250° C., a mold temperature at 100° C., and a molding cycle for 30 seconds and using a mold having two gates to form a weldline on the surface of an article specimen (width×length×thickness=100 mm×150 mm×3 mm). On the other hand, an article specimen of Comparative Example 3 was plated with aluminum.

The flop index, sparkle intensity, and luminance of each article according to Examples 1 to 4 and Comparative Examples 1 to 3 were measured in the following method, and the results are provided in the following Table 2.

(1) Flop Index (FI)

The flop index is an index indicating a metal-like texture of a surface and may be represented by the following Equation 1. More specifically, the flop index is obtained by measuring reflectivity change while an angle of reflection is revolved and by specifically, measuring luminance (L*) at each reflection angle of 15°, 45° and 110° an then, calculating the measurements according to the Equation 1. The L*(x°) indicates luminance measured at x°. The flop index is measured by using a BYK-Mac spectrophotometer made by BYK Inc.

$$FI=2.69\times(L(15°)-L(110°))^{1.11}/L(45°)^{0.86}$$ [Equation 1]

One surface having no metal-like texture has a flop index of 0, a metal has a flop index ranging from 15 to 17, a metal-like texture coating used for an automobile body paint has a flop index of 11; and the metal-like texture sensed by eyes has a flop index of greater than or equal to 6.5.

(2) Sparkle Intensity

The sparkle intensity is an index of a metal particle texture and may be obtained according to Equation 2.

$$\Delta S_{total} = \sqrt{\frac{\Delta S_{15°}^2 + \Delta S_{45°}^2 + \Delta S_{75°}^2 + \Delta G^2}{4}}$$ [Equation 2]

In Equation 2, indicates sparkle intensity measured at x°, and ΔG is diffusion of each ΔS(x°) and indicates graininess of metal particles. The sparkle intensity ($\Delta S_{total}$) of the article is calculated according to the Equation 2 after measuring each sparkle intensity at about 15°, 45°, and 75°. The sparkle intensity is measured by using an MA98 multi-angle spectrophotometer made by X-Rite Inc.

The sparkle intensity calculated according to Equation 2 is obtained by combining the following factors.

[Four Factors]
Reflectivity of individual metal particle
Amounts of metal particle
Sizes of metal particle
Orientation of metal particle (3) Luminance The luminance is an index showing brightness such as metal gloss and is measured using a gloss level at about 60° with an UGV-6P digital variable gloss meter (SUGA Inc.).

TABLE 2

| Items | Examples | | | | Comparative Examples | | |
|---|---|---|---|---|---|---|---|
| | 1 | 2 | 3 | 4 | 1 | 2 | 3 |
| Metal-like texture (Flop index) | 20 | 25 | 22 | 17 | 6 | 11 | 25 |
| Metal particle texture (Sparkle intensity) | 15 | 19 | 16 | 13 | 8 | 4 | 20 |
| Luminance (%) (Gloss level, 60°) | 85 | 92 | 89 | 80 | 72 | 60 | 95 |

Referring to the Table 2, Examples 1 to 4 had a flop index ranging from 17 to 25, sparkle intensity ranging from 13 to 19, and luminance ranging from 80 to 92%, metal-like texture and thus, showed excellent metal-like texture, metal particle texture and luminance compared with Comparative Examples 1 and 2. In addition, Examples 1 to 4 showed similar metal-like texture, metal particle texture and luminance to Comparative Example 3 in which aluminum-plating was performed.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

DESCRIPTION OF SYMBOLS 11, 12, 13: metal deposition layer
21, 22, 23, 24, 25: thermosetting resin layer
31: thermoplastic resin layer
41: auxiliary layer

The invention claimed is:

1. A complex material comprising
a first metal deposition layer, a first thermosetting resin layer positioned on one side of the first metal deposition layer, and a second thermosetting resin layer positioned on the other side of the first metal deposition layer, wherein a thickness of the first metal deposition layer is 0.01 to 1.0 μm.

2. The complex material of claim 1, wherein the complex material further comprises a second metal deposition layer positioned on at least one side selected from one side of the first thermosetting resin layer and one side of the second thermosetting resin layer, and
a third thermosetting resin layer positioned on one side of the second metal deposition layer.

3. The complex material of claim 1, wherein the complex material further comprises a thermoplastic resin layer positioned on at least one side selected from one side of the first thermosetting resin layer and one side of the second thermosetting resin layer.

4. The complex material of claim 3, wherein the complex material further comprises an auxiliary layer positioned between the first thermosetting resin layer and the thermoplastic resin layer, or between the second thermosetting resin layer and the thermoplastic resin layer.

5. The complex material of claim 3, wherein the complex material further comprises a fourth thermosetting resin layer positioned on one side of the thermoplastic resin layer.

6. The complex material of claim 5, wherein the complex material further comprises a third metal deposition layer positioned on one side of the fourth thermosetting resin layer and a fifth thermosetting resin layer positioned on one side of the third metal deposition layer.

7. The complex material of claim 3, wherein the thermoplastic resin layer comprises a polycarbonate resin, a rubber-modified vinyl-based copolymer resin, polyester resin, polyalkyl(meth)acrylate resin, a styrene-based polymer, a polyolefin resin, or a combination thereof.

8. The complex material of claim 1, wherein the first metal deposition layer is an aluminum deposition layer.

9. The complex material of claim 1, wherein the first thermosetting resin layer and the second thermosetting resin layer are independently a phenolic resin, an epoxy resin, an unsaturated polyester resin, an urethane resin, an urea resin, a melamine resin, an alkyd resin, a silicone resin, a vinyl ester resin, or a combination thereof.

10. The complex material of claim 1, wherein each refractive index of the first thermosetting resin layer and the second thermosetting resin layer is 1.45 to 1.55.

11. The complex material of claim 1, wherein the first thermosetting resin layer and the second thermosetting resin layer are transparent or translucent.

12. The complex material of claim 1, wherein a thickness of the complex material is 1 to 100 μm.

13. The complex material of claim 1, wherein a particle diameter of the complex material is 2 to 2,000 μm.

14. A method of preparing a complex material, comprising
forming a first thermosetting resin layer on a substrate,
forming a metal deposition layer on the first thermosetting resin layer, wherein a thickness of the first metal deposition layer is 0.01 to 1.0 μm, and
forming a second thermosetting resin layer on the metal deposition layer.

15. The method of claim 14, wherein the substrate is a thermoplastic resin layer.

16. The method of claim 14, wherein the formation of the first thermosetting resin layer comprises applying a first thermosetting resin composition on the substrate and heat-treating it, and
the formation of the second thermosetting resin layer comprises applying a second thermosetting resin composition on the metal deposition layer and heat-treating it.

17. The method of claim 14, which further comprises forming an auxiliary layer on one side of the substrate before forming the first thermosetting resin layer.

18. The method of claim 14, which further comprises separating the substrate and the first thermosetting resin layer after forming the second thermosetting resin layer.

19. The method of claim 14, which further comprises forming a second metal deposition layer on the second thermosetting resin layer after forming the second thermosetting resin layer, and
forming a third thermosetting resin layer on the second metal deposition layer.

20. The method of claim 14, which further comprises forming a fourth thermosetting resin layer on the external side of the substrate after forming the second thermosetting resin layer.

21. The method of claim 20, which further comprises
forming a third metal deposition layer on the external side of the fourth thermosetting resin layer after forming the fourth thermosetting resin layer, and
forming a fifth thermosetting resin layer on the external side of the third metal deposition layer.

* * * * *